United States Statutory Invention Registration [19]

[11] Reg. Number: H937

Sloan [43] Published: Jul. 2, 1991

[54] BULKING AGENT FOR BAKED PRODUCTS

[75] Inventor: Jane L. Sloan, Aliceville, Ala.

[73] Assignee: A. E. Staley Manufacturing Company, Decatur, Ill.

[21] Appl. No.: 408,652

[22] Filed: Sep. 18, 1989

[51] Int. Cl.[5] ..... A21D 10/00; A21D 13/00; A21D 10/84

[52] U.S. Cl. ..... 426/549; 426/552; 426/555

[58] Field of Search ..... 426/549, 552, 555

[56] References Cited

U.S. PATENT DOCUMENTS

| | | | |
|---|---|---|---|
| 3,694,230 | 9/1972 | Cooke | 99/94 |
| 3,766,165 | 10/1973 | Rennhard | 260/209 R |
| 3,876,794 | 4/1975 | Rennhard | 426/548 |
| 4,456,626 | 6/1984 | Nelson et al. | 426/554 |
| 4,622,233 | 11/1986 | Torres | 426/548 |
| 4,668,519 | 5/1987 | Dartey et al. | 426/658 |
| 4,873,098 | 10/1989 | Banks et al. | 426/94 |

FOREIGN PATENT DOCUMENTS 312391 4/1989 European Pat. Off. .

OTHER PUBLICATIONS

Technical Bulletin "Pfizer Polydextrose for Market That's Shaping Up", pp. 1-14 (Pfizer, Inc., 1985).

U.S. Ser. No. 07/408,344 as filed on Sep. 18, 1989 by Gaddy and White entitled "Bulking Agent Composition".

L. Stryer, *Biochemistry,* pp. 396 and 397 (W. H. Freeman and Co., San Francisco, 1975).

B. S. Kamel and V. F. Rasper, "Effects of Emulsifiers, Sorbitol, Polydextrose, and Crystalline Cellulose on the Texture of Reduced Calorie Cakes", *Journal of Texture Studies,* vol. 19, pp. 307-320 (1988).

*Primary Examiner*—Robert L. Stoll
*Assistant Examiner*—Shean C. Wu

[57] ABSTRACT

A dry blend useful as a bulking agent in the replacement of carbohydrates and/or fats is provided. The dry blend is comprised of a mixture of a randomly-bonded polysaccharide and a cold-water-gelling granular starch having a cold-water solubility of at least about 50% by weight. Also provided are culinary premixes and method of formulating culinary premixes.

5 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

BULKING AGENT FOR BAKED PRODUCTS

FIELD OF THE INVENTION

This invention relates to bulking agents useful in the production of baked products and to a method of formulating such baked products.

BACKGROUND OF THE INVENTION

Products made from traditional ingredients are the standard of excellence for crumb-structured, sweetened, snack products whether they are home-baked or purchased from a bakery. Important features of these baked products are their fresh flavor and moist, chewy texture. Particularly popular baked products are snack products such as cupcakes, muffins, quick breads, cookies, layer cakes, and filled pies.

Conventional crumb-structured baked goods are made from shortening, flour, water, sugar (sucrose) and usually eggs. Each of these ingredients plays an important role in producing baked goods with their well-known flavor and texture characteristics. The ingredients must be combined in particular proportions in order to get the desired results. Minor amounts of other ingredients, such as flour enrichers, leavening, salt and various flavorings, may be added depending on the final form of snack product desired. Such baking techniques and ingredient choices are well known by one skilled in the art of baking.

The use of reduced calorie materials as bulking agents in place of one or more traditional or conventional ingredients is known. For example, polydextrose has been promoted to replace a portion of the sugar in various baked goods. The technical bulletin "Pfizer Polydextrose for the Market That's Shaping Up", pp. 1–14 (Pfizer, Inc., 1985), recites formulas for different cakes, rolls, cookies, and brownies in which polydextrose was used to replace a minor portion of the sucrose and/or fat in the formulation.

SUMMARY OF THE INVENTION

This invention relates to a dry blend composition useful in the preparation of baked products comprising a major amount by weight of a randomly-bonded polysaccharide and a minor amount by weight of a cold-water-gelling granular starch having a cold-water solubility of at least about 50% by weight.

This invention also relates to a method of formulating a culinary premix for a baked good, said premix comprising flour and a member selected from the group consisting of sugar and fat, said method comprising replacing at least a portion of said member with a dry blend composition of claim 1. The method can employ the dry blend as a premix or as individual components added separately to the culinary premix.

In other embodiments, this invention relates to a culinary premix composition useful for preparing baked goods comprising a major amount by weight of flour, a first minor amount by weight of a randomly-bonded polysaccharide, and a second minor amount by weight of a cold-water-gelling granular starch having a cold-water solubility of at least about 50% by weight.

It has been found that the replacement of the bulk of the sucrose in crumb-textured baked products, e.g., cookies, with polydextrose alone generally results in a product with a hard, flat texture that is organoleptically unacceptable. However, the use of both polydextrose and the granular cold-water-gelling starches described above, allows for replacement of the bulk of the sugar and yet produces baked products having excellent volume and texture.

DETAILED DESCRIPTION OF THE INVENTION

The dry blend composition of this invention is comprised of at least two critical components. One critical component, present in a major amount by weight (i.e., an amount greater than any other component), is a randomly-bonded polysaccharide. The other critical component is a cold-water-gelling granular starch as referred to above and described more fully below, which is present in a minor amount by weight of the dry blend (i.e., an amount less than the major component). The precise ratio of randomly-bonded polysaccharide to the cold-water-gelling granular starch may generally range from just greater than about 1:1 to about 100:1, but will typically be from about 2:1 to about 30:1, and preferably from about a 5:1 to about 20:1.

The randomly-bonded polysaccharide component useful in this invention is a polymer comprised of randomly-bonded saccharide units. The polymer is produced by the acid-catalyzed polymerization of reducing saccharides of one or more sources thereof. The linkages between saccharide units which predominate in the polymer are primarily 1→6 linkages, but other linkages also occur. The number average molecular weight will generally range from about 1,000 g/mole to about 36,000 g/mole. These polysaccharides are generally unaffected by amylolytic enzymes such as amylo(1,4)-glucosidases, amylo(1,4:1,6)glucosidases, amylo(1,4-)dextrinases, and amylo(1,4)maltosidases as well as alpha- and beta-glucosidases, sucrase and phosphorylase. Thus, they are substantially inert to digestion by mammalian enzymes, although mammalian intestinal flora may be able to ferment a portion of the polysaccharide and make fermentation products available for digestion by mammals.

The randomly-branched polysaccharide can be prepared by any process which yields a product safe for human consumption. For example, U.S. Pat. No. 3,766,165 (Rennhard), the disclosure of which is incorporated herein by reference, discloses the preparation of such polysaccharides by the melt polymerization of a reducing saccharide, e.g., glucose or maltose, using edible acids as catalysts and, optionally, crosslinking agents. U.S. Pat. No. 4,622,233 (Torres), the disclosure of which is incorporated herein by reference, discloses a purified, decolorized polysaccharide of the type disclosed by Rennhard.

It will be understood that the terms polyglucose, polymaltose and polysaccharide, as used in describing this invention, are intended to denominate randomly-bonded polymeric materials in which the majority of monomeric moieties are glucose, maltose or other saccharide, as well as polymeric materials in which the glucose, maltose or saccharide moieties are esterified with moieties derived from any carboxylic acids used as polymerization activators.

The starting materials used in the melt polymerization process are maltose or glucose, although other simple sugars may be used as well. The sugars are supplied to the process as dry anhydrides or dry hydrated solids and are in powdered form.

The acids used as catalysts, crosslinking agents or polymerization activators may be any one of a series of edible acids. In particular, it is preferred to use citric, fumaric, tartaric, succinic, adipic, itaconic or terephthalic acids. The anhydrides of succinic, adipic, and itaconic acids may also be used. The acid or anhydride must be food-acceptable, that is, palatable and free of significant adverse effect at the level of ordinary use. Inedible acids, while chemically suitable to the process, are not suitable for use in the production of edible polyglucoses or polymaltoses. Therefore, the selection of the acid catalyst to be used must be guide by the needs of human non-toxicity. Inorganic acids may not be suitable for use as acid catalysts in anhydrous melt polymerization since they may not serve as crosslinking agents in the production of the insoluble polyglucoses and polymaltoses. Monocarboxylic acids may not be effective a crosslinking agents and will not be as satisfactory as polycarboxylic acids as catalysts in anhydrous melt polymerization. The acid selected should be relatively non-volatile, since more volatile acids may be vaporized during the heating and melting processes by which the mixture is polymerized. The polycarboxylic acids used are largely, but incompletely, esterified with the polyglucose or polymaltose in the polymerizing process, forming acid polyglucose esters are acid polymaltose esters. This is evidenced by the residual acidity of the polyglucoses and polymaltoses after dialysis, and the recovery of the acid upon hydrolysis of the product. The incorporation of the acid moieties within the polyglucoses or polymaltoses does not affect their suitability for human consumption.

The acid moieties are likely to serve as crosslinking agents between different polyglucose or polymaltose molecules in the insoluble polymers whereas, in the soluble polymers, each acid moiety is more likely to be esterified to only the polymer molecule.

The performance of this melt polymerization typically involves the steps of combining dry glucose or maltose with the proper amount of acid; the heating and melting of the glucose or maltose and the acid under reduced pressure; the maintenance of the molten conditions in the absence of water until substantial polymerization occurs; and the separation of the individual polymeric product types.

The anhydrous melt polymerization must be carried out at a pressure below atmospheric pressure. The preferred pressures do not exceed about 300 mm, e.g., from about $10^{-5}$ to 100–300 mm Hg, and can be obtained by the use of a vacuum pump, a steam jet ejector, an aspirator or by other means. The vacuum is required in order to exclude air from the polymerization and to remove the water of hydration and the water liberated in the polymerization reaction. Air should be excluded from the environment of the polymerizing mixture in order to minimize decomposition and discoloration of the polyglucoses or polymaltoses formed in the polymerization. A fine stream of nitrogen may be useful with this invention as a method for excluding air and removing the waters of hydration and polymerization which are formed. Where the nitrogen purge is used, the vacuum requirements are lessened but pressures of 100–300 mm Hg or less are still preferred.

The duration of the reaction and the reaction temperature are interdependent variables in the operation of this invention. A preferable temperature for the melt polymerization in the laboratory is from about 140° C. to about 180° C. The precise temperature for the anhydrous melt polymerization depends on the initial ratio of glucose, maltose or other sugars to the acid which is used, the reaction time and the proportion of soluble polyglucoses or polymaltoses to insoluble, crosslinked polyglucoses or polymaltoses which is desired in the final product mixture.

The production of a large portion of soluble glucose or maltose polymers usually requires a concentration of acid catalyst between about 0.1 and 10 mole percent, and it is preferred to use between 0.5 and 5 percent. As the amount of acid is increased, the degree of acid crosslinking increases and the proportion of water-insoluble polyglucose or polymaltose increases. Where acid concentrations are unnecessarily high, problems may arise with regard to neutralizing the excess acid which is present in the final product mixture. As those skilled in the art will perceive, the amount of acid required for a particular polymerization, the polymerization duration, the polymerization temperature and the nature of the products desired are all interdependent. The selection of the amount of acid to be used in this invention should take account of these factors.

The thermal exposure (reaction time and temperature) used in the production of soluble polyglucoses or polymaltoses by melt polymerization should be as low as possible, since discoloration, caramelization and degradation increase with prolonged exposure to high temperature. Fortunately, however, as the temperature of the polymerization is increased, the time required to achieved substantially complete polymerization decreases. Therefore, the process of this invention may be conducted with a polymerization temperature of about 160° C. and a reaction duration of about 8 hours, as well as at a temperature of about 140° C. and a reaction duration of about 24 hours, with approximately the same resultant degree of polymerization. Comparable results are also achieved in continuous polymerization at temperatures in the range of about 200°–300° C. in about 10 minutes or less without significant darkening, under vacuum of course.

In the production of insoluble polyglucoses or polymaltoses, the molar ratio of glucose or maltose to acid may also be within the ranges specified above for production of the soluble polysaccharides, and especially about 2.5–10 mole percent of acid. It is preferred, however, in the performance of this invention to use a molar ratio of glucose or maltose to acid between about 12:1 and 20:1 in the production of insoluble polyglucose or polymaltose. These ratios are preferred in spite of the requirements of high reaction temperature and relatively long reaction times because the total yield of soluble and insoluble polyglucoses or polymaltoses is between 90 and 99 percent at these sugar to acid ratios. Thus, using these higher ratios, it is possible to produce in one reaction mixture a yield of between about 50 and 60 percent of insoluble polyglucose or polymaltose and of between about 40 and 50 percent of soluble polyglucose or polymaltose. The water-soluble polyglucose or polymaltose can be separated from the insoluble polyglucose or polymaltose contained in the reaction mixture by extraction with water and subsequent centrifugation. An additional important advantage of performing the reaction at high molar ratios of glucose or maltose to acid derives from the fact that the resultant products require little or no neutralization, where neutralization of excess acid levels introduces salt concentrations unacceptable in product for use in foods.

The inclusion of a food acceptable polyol such as sorbitol in the saccharide-carboxylic acid reaction mixtures prior to polycondensation yields superior products. In most cases, 90% or more of the polyol cannot be isolated from the condensation product, demonstrating that it has been chemically incorporated in the polymer. These additives function as internal plasticizers to reduce viscosity, and also provide improved color and taste. This is evident, for example, in the manufacture of hard candy from such condensation polymers, where the rheological properties of the melt are improved during processing, and a better tasting product of lighter color is obtained. In addition to sorbitol, other food-acceptable polyols include glycerol, crythritol, xylitol, mannitol and galactitol. Polyol concentrations of from about 5 to 20% by weight of the total reaction mixture provide such advantages, and levels of about 8 to 12% by weight are preferred.

Chemical purification is not generally required for the products of this invention. Where insoluble and soluble glucoses or maltoses are produced together, separation may be required.

Neutralization of the polyglucoses or polymaltoses may be desirable for certain applications, despite the very low levels of acid catalyst which are employed. For example, where the polyglucoses are to be used in dietetic foods containing whole milk, excess acid which may be present in the unneutralized polyglucoses will tend to curdle the milk. In the case of the soluble polyglucoses or polymaltoses, the solutions of the polyglucoses or polymaltoses are neutralized directly. This neutralization may be accomplished by adding carbonates or bicarbonates of potassium, sodium, calcium or magnesium to the solutions of polyglucose or polymaltose. Where sodium and potassium are used together, a physiologically balanced mixture may be used. The salt content of a typical polyglucose solution which has been adjusted to a pH of about 5 to 6 should be about 0.5 to 1.0 percent. Other materials which may be used to adjust the pH of soluble polyglucose or polymaltose solutions include L-lysine, d-glucosamine, N-methyl glucamine and ammonium hydroxide. The first two of these compounds are natural materials and should not be objectionable as an ingredient of dietetic foods and the last compound, which is rapidly excreted by the body in the form of urea, would not be objectionable as an ingredient in dietetic foods. N-methyl glucamine is used as a solubilizing agent for pharmaceuticals and should not be objectionable as an ingredient in dietetic foods. Other methods for reducing the acidity of polyglucose or polymaltose solutions are dialysis and ion exchange.

Decolorization of the soluble and insoluble polyglucoses and polymaltoses useful in this invention is often desirable for certain uses, despite their inherently light color as produced. Soluble polyglucose or polymaltose may be decolorized by contacting a soluble of the polyglucose or polymaltose with activated carbon or charcoal, by slurrying or by passing the solution through a bed of the solid adsorbent. Soluble and insoluble polyglucoses and polymaltoses may be bleached with sodium chlorite, hydrogen peroxide or similar materials which are used for bleaching flour. The insoluble polyglucose is a yellow powder and often does not require bleaching at all.

Where insoluble polyglucose is to be used as a flour substitute in dietetic foods, it may be ground or subdivided mechanically so that it manifests a consistency similar to that of wheat flour. Typically, 325 mesh material is used as the wheat flour substitute.

The solutions of soluble polyglucose or polymaltose are almost tasteless and the insoluble polyglucose is a bland-tasting yellow powder.

Most of the polyglucoses produced by the melt polymerization have an average molecular weight from about 1,500 to about 36,000. The soluble polyglucoses will generally have an average molecular weight from about 1,500 to about 18,000 and the insoluble polyglucoses will generally have an average molecular weight between about 6,000 and about 36,000.

The randomly-bonded polysaccharide preferred for use herein is polydextrose. Polydextrose is defined by federal regulations as a partially metabolizable water-soluble polymer prepared from D-glucose with small amounts of sorbitol and citric acid, which polymer may be partially neutralized with potassium hydroxide. Polydextrose is commercially available from Pfizer, Inc. as a composition comprised of greater than 90% polymer, less than 4% each of glucose and levoglucosan and less than 2% sorbitol. The acid form is commercially available as a dry powder having less than 4% water. Neutralized polydextrose is available as a 70% dry solids solution with a pH of from 5 to 6 or as a neutralized powder. A neutralized solution can be treated to remove water and yield a dry powder, e.g., by evaporation of the water at elevated temperatures and/or reduced pressures.

A particularly preferred polydextrose is disclosed in copending application Ser. No. 07/408,344 filed on even date herein by D. C. White and J. M. Gaddy, entitled "Bulking Agent Composition", the disclosure of which is incorporated by reference. That application discloses a randomly-bonded polysaccharide having a mean particle size and a particle size distribution which contributes to efficient hydration of the material in systems such as doughs and batters for baked goods, e.g., a means particle size within a range of from about 75 microns to about 500 microns with at least about 50% by weight of said particles being within said range.

Another component of the edible dry blend compositions is a cold-water-gelling granular starch. This starch is distinguished from pregelatinized starch in that most of the granules are still intact despite the ability of the starch to swell and then gel in cold water, e.g., water at room temperature. The starch is also characterized as unmodified, i.e., having little or no chemical modification that impairs the ability of the starch to form a gel. The ability of the granular starch to swell and then form a gel in cold water can be visually observed, e.g., with a microscope, and can be quantified by measuring the viscosity of an aqueous dispersion of the starch. The ability of the starch to swell in cold water can generally be correlated to the cold-water solubility of the starch. Thus cold-water-solubility can generally be used as a measure of cold water "swellability". Cold-water solubility is conveniently determined by mixing a known weight of starch in a measured volume of distilled water at room temperature with a Waring blender, centrifuging the starch suspension and weighing the residue obtained by evaporation of a measured aliquot of the supernatant liquid. The cold-water solubility of the sample is expressed as % solubles, dry solids basis (dsb).

The treatment of the starch to increase its ability to swell in cold water (hereinafter referred to as "conversion") is generally accomplished by contacting the granular starch with an aqueous alcohol, said contacting occurring for a time and at a temperature sufficient to achieve the desired degree of conversion. In general, substantially complete conversion is desired and, thus, the following description will be largely devoted to techniques which can be used to accomplish the same.

In the preferred embodiments, a native granular starch is first slurried in a liquid medium comprised of water and an alcohol selected from ethanol, n-propanol and isopropanol and then heated under pressure above the boiling point of the slurry for a time sufficient to achieve the desired degree of conversion, but insufficient to otherwise degrade the granular starch.

In specific, preferred embodiments, the first step in carrying out the process is the preparation of a slurry comprised of about 10 to about 25 parts by weight dry substance basis (dsb) of a granular corn starch in a liquid medium comprised of about 50 to about 75 parts by weight of an alcohol selected from ethanol, denatured ethanol, propanol and isopropanol and about 13 to about 30 parts by weight of water, provided that the liquid medium for the slurry contains about 15 to about 35% by weight of water inclusive of the water in the starch (i.e., the weight ratio of alcohol to water is about 5.7:1 to 1.9:1). Preferably, the slurry is comprised of about 12 to about 20% by weight of starch (dsb) and about 17 to about 30% water.

The aforedescribed slurry of granular corn starch in an aqueous alcohol medium is heated to a temperature of about 300° to about 360° F. under autogenic pressure for about 1 to about 30 minutes. The heating process can be conducted as a batch process in a sealed vessel or as a continuous or semi-continuous process by passing the slurry through a residence time for the slurry in the heated zone of about 1 to 30 minutes. Preferably, the starch slurry is heated to a temperature of about 315° to about 350° F. for a period of about 1 to about 10 minutes to convert the ungelatinized corn starch to the present cold-water-swelling starch having high cold-water solubility. In a most preferred embodiment of the present process, the ungelatinized corn starch slurry contains about 12 to about 20% by weight of starch (dsb) and the liquid medium for the slurry contains about 18 to about 26% by weight of water (i.e., the weight ratio of alcohol to water is about 4.6:1 to 2.8:1); conversion of the ungelatinized corn starch to the present cold-water-swelling-/soluble starch is accomplished by heating the slurry to a temperature of about 325° to about 340° F. for a period of about 2 to about 5 minutes.

After the heating step, the slurry can be cooled to below about 120° F., and the product cold-water-swelling granular starch is separated from the liquid medium component of the slurry by filtration or contrifugation. Following the recovery of the starch product from the reaction slurry, the starch can be washed with 1 or more volumes of the alcohol used in the process, and dried and/or desolventized by conventional methods. For example, the starch can be dried in an oven to a certain volatiles level and then contacted with a hot humid gas, preferably moist air or steam, while the starch is maintained at a temperature from about 100° to about 250° F. for a time sufficient to reduce the alcohol content of the starch to the desired level.

The dry blend can be made by dry blending the ingredients using conventional dry blending techniques, e.g., sifting and the like. The degree of homogenity is not critical, although the blend is preferably macroscopically uniform.

The dry blend has particular utility as a replacement for carbohydrates (e.g., sugar and/or flour) and/or shortening in baked goods. Accordingly, the dry blend, or the individual components thereof, can be mixed with a finely divided carbohydrate, e.g., all-purpose flour, to form a dry mix useful in preparing baked goods. By "baked goods" is meant those goods which are fried, e.g., doughnuts, shell pastries, pancakes, and the like, as well oven baked goods such as cakes, cookies, and brownies. The components of the dry blend will generally comprise only a minor portion of the carbohydrate-based dry mix. Typically, 50 to 100% weight of the sucrose used in a dry mix can be advantageously replaced by the components of the dry blend.

The other typical components of the baked products will discussed in detail below.

Flour provides the major component in the bakery products of the present invention. The flour may be any finely comminuted meal of any cereal grain or edible seed, or mixtures thereof, as are known by one skilled in the art of baking. Typical non-limiting examples include wheat flour, barley flour, rye flour, cornstarch and corn flour, triticale, and also the so-called synthetic flour, which incorporate such materials as starch and soy protein isolate, with or without heat and/or steam treatment. The wheat flours are most typically employed in baking. They consist of several types, including hard red spring, hard red winter, soft red winter and white winter and spring. They are distinguished by differences in gluten quality, water absorption and protein content. Protein in these flours can vary from about 7 to about 14%, with the soft wheat flours having protein contents at the lower end of that range and hard winter wheat flours having protein contents at the upper end of that range.

The amount of protein in a baked good influences its texture and tenderness. The primary source for protein in baking is egg. However, since flour also contains some protein, the type of flour used in baking can influence the final product's texture somewhat. The higher the protein content in a flour, the tougher texture a product baked with that flour will have.

Shortening, in the form of oil or a higher melting fat, is generally included in baked goods of the type disclosed in the present invention. Shortenings contribute flavor and texture to baked goods. The shortenings that can be employed in the present invention are well known by one skilled in the art of baking and include solid or plastic, as well as liquid or semi-fluid, glyceride shortenings derived from animal, vegetable fats and oils, including synthetically prepared shortenings. These glycerides can contain saturated and unsaturated "long-chain" acyl radicals having from about 12 to about 22 carbon atoms such as lauroyl, lauroyleoyl, myristoyl, myristoleoyl, palmitoyl, palmitoleoyl, stearoyl, oleoyl, linoleoyl, linolenoyl, arachidoyl, arachidonoyl, behenoyl, erucoyl, and the like and are generally obtained from edible oils and fats such as corn oil, cottonseed oils, soybean oil, coconut oil, rapeseed oil, peanut oil, olive oil, palm oil, palm kernel oils, sunflower seed oil, wallflower oil, lard, tallow and the like. These glycerides can also contain, in part, one or two short-chain acyl groups having from 2 to about 6 carbon atoms such as acetyl, propanol, valeryl, and caproyl; they can be prepared by random or low-temperature interesterification reactions of fatty triglyceride containing oils and fats such as interesterified or rearranged cottonseed oil and lard; and they can be otherwise formed by various organic syntheses.

Some preferred shortenings are soybean-based shortenings or oils, hydrogenated soybean-based shortening or oil, corn oil, palm oil, hydrogenated palm oil, lard and tallow oils. Of these, "Crisco" brand shortening or oil, which is soybean-based, is preferred. "Crisco" oil or shortening is commercially available from The Procter & Gamble Company. The amount of shortening in the baked goods of the present invention is from about 10 to about 25%.

Preferably, fresh whole eggs are used in making the baked products of the present invention. Eggs impart flavor, richness and color to the baked goods. On the average, an egg contains about 73% water and about 27% egg solids. The egg solids comprise about 48% protein, about 44% fat, and about 8% minor materials. Alternatively, egg solids, particularly egg albumen and dried yolk, may be used in baking the products disclosed herein. Soy isolates, whey protein concentrates, or other egg substitutes may also be used herein in combination with, or in place of the egg solids. Such substitutes are well known to those skilled in the art of baking. From 0 to about 6%, preferably from about 0.1 to about 6%, on a dry solids basis, of the formulation for the products of the present invention should comprise egg or egg substitute.

Chemical leavening agents can also be added to the compositions of the present invention to provide aeration to the final product. Examples include a baking soda, e.g., sodium, potassium, or ammonium bicarbonate, alone or in combination with a baking acid, preferably sodium aluminum phosphate, monocalcium phosphate, dicalcium phosphate or mixtures thereof. The selection of the leaving system is within the knowledge of one skilled in the art. From 0 to about 2%, preferably from about 0.1 to about 2%, of the formulation for the products of the present invention will typically be leavening agent.

Additional components can be added to the batter or dough of the present invention prior to baking to provide a wide variety of snack products. Additives may be a type that remain as whole pieces in the snack product. Such additives include, but are not limited to, chocolate, peanut butter or butterscotch chips or chunks; fruit or fruit-flavored bits, such as blueberry, strawberry, or citrus flavored bits, other fruit flavored bits, such as cherry, blackberry, apricot, raisin, date, or apple; cereals, such as bran or oatmeal; and nutmeats, including walnuts, black walnuts, hickory nuts, hazel nuts, Brazil nuts, peanuts, macadamia nuts, pecans, almonds, cashews, coconut and the like. From 0 up to about 40% of the final baked product of the present invention can be such additive.

Other components of a type that are blended into the dough or batter prior to baking may be incorporated to add flavor, aroma, and color to the final baked product. For example, peanut butter; spices, such as cinnamon, mace, nutmeg, caraway, anise, allspice, poppy seed, coriander, ginger, cloves, fennel, and salt; and flavorings, such as banana, orange, lemon, mint or vanilla. Honey or molasses may also be used in the present invention but the levels of the individual sugars in the saccharide mixture must be altered to account for the sugars in the molasses or honey. Mixtures of these flavorings and whole piece components can be added to provide a variety of desirable products. Up to about 25% of the final baked product of the present invention can be comprised of such additives. The exact amount added for any of these flavoring components (whether they are of the type that is blended into the composition or the type that remain as whole pieces) will depend on personal preference and on what particularly is being added.

For a chocolate snack product, cocoa is incorporated into the dough or batter prior to baking. The cocoa used in this invention can be processed from either natural or "Dutched" chocolate from which a substantial portion of the fat or cocoa butter has been expressed or removed by solvent extraction, by pressing, or by other means known to those skilled in the art. Cocoa suitable for use in the practice of this invention may contain from about 1 to about 30% fatty constituents.

Dutched chocolate is prepared by treating cocoa nibs with an alkali material, such as potassium carbonate, in a manner well known in the art. Generally, it tends to have a darker color and also can be more flavorful than natural cocoas.

Chocolate can be used in practicing the present invention and it is intended, therefore, that chocolate, as described above, is to be encompassed by the term "cocoa", when chocolate is used, it should be in a finely divided form. It may be necessary to reduce the amount of shortening in the mix when chocolate is used because of the additional fat present as cocoa butter. It may also be necessary to add larger amounts of chocolate as compared to cocoa in order to provide equivalent flavoring and coloring.

The basic components and the optional components that make up the baked goods of the present invention can be combined in a number of slightly different ways to yield different types of baked goods. Obviously, the amount and type of flavorings, spices, or whole piece components, such as chocolate chips, nuts, etc., can be manipulated to vary the products. Different icings or streusel toppings can also be added for variation. Additionally, the texture of these products can be altered to yield different types of product. This is done through the manipulation of the total protein content in the composition of the baked good. It is the protein content that gives a baked product its structure. Two important sources of protein are found in baked goods, protein in the flour, and protein in the egg ( or egg substitute). A brownie or cookie, which tends to be a denser product, contains a limited amount of protein. A snack cake or muffin is characterized by a lighter, airier structure. Additional protein must be added to create a product with this type of texture. The preferred source for this added protein is egg white. Other acceptable sources of protein that will give the product this lighter, airier texture include, but are not limited to, non-fat milk solids, casein, sodium caseinate, calcium caseinate, modified casein, sweet dairy whey, modified whey, and whey protein concentrate. For each product, the components can be combined with, for example, any planetary bowl mixer, ribbon blender, or other conventional mixer.

One aspect of the present invention is a culinary premix product for which the consumer completes preparation. Such a premix could be made by combining only the flour and unique dry blend component of the present invention. The consumer can then add a specified amount of shortening or oil, water, eggs, leavening, salt, and flavorings and bake the resulting batter to form the desired product. A preferred premix includes the dry blend mixture, flour, and leavening. The consumer would then need to add only fresh egg, shortening, and water to the mix and bake the batter to form the desired product. Such a form of premix would be especially suitable for sale to a consumer for baking in the home.

A culinary premix more suitable for sale to a commercial baker would also include dry egg solids in the mix so that the baker would only need to add water to form the batter for baking. The premix also comprises from about 10 to about 25% of a shortening component, from 0 to about 6%, preferably from about 0.1 to about 6%, on a dry solids basis, of an egg component and from 0 to about 2%, preferably from about 0.1 to about 2%, of a leavening agent.

The function of leavening agents is to aerate the dough or batter and thereby render it light and porous. The porosity of a batter, which on baking is transmitted to the crumb of the finished product, is important for various reasons: it is responsible for good volume, improves eating quality by tenderizing the crumb, and contributes to the esthetic enjoyment of the final product by endowing it with such desirable attributes as uniform cell structure, bright crumb color, soft texture, enhanced palatability, and others.

Leavening can be accomplished by various means. These include yeast fermentation to generate carbon dioxide gas, the mechanical incorporation of air into doughs and batters by mixing and creaming action, and by the formation of water vapor under the influence of the heat of baking. However, the nearly exclusive method used in leavening snack products is by chemical leaveners that consist of sodium bicarbonate and acidic agents. When these are combined and brought into contact with water, they react to generate carbon dioxide gas in controlled volumes and at controlled rates of evolution. Sodium bicarbonate ($NaHCO_3$), or baking soda, is by far the most widely used source of carbon dioxide in chemical leavening systems, primarily because of its low cost, ease of handling, absence of toxicity, general high purity, and absence of aftertaste in the baked product when it has fully reacted.

Common leavening acids used in conjunction with baking soda include:

monocalcium phosphate monohydrate (MCP);
anhydrous monocalcium phosphate (AMCP);
sodium acid pyrophosphate (SAPP);
sodium aluminum phosphate (SALP);
sodium aluminum sulfate (SAS);
monopotassium tartrate (cream of tartar);
dicalcium phosphate dihydrate (DCP); and
glucono-delta-lactone (GDL).

Baking powders can be used as the leavening agent. Baking powders conform to the following general definition issued by the U.S. Department of Agriculture: "Baking powder is the leavening agent produced by the mixing of an acid-reacting material and sodium bicarbonate, with or without starch or flour. It yields not less than 12% of available carbon dioxide. The acid-reacting materials in baking powder are: (1) tartaric acid or its acid salts; (2) acid salts of phosphoric acid (3) compounds of aluminum; or (4) any combination in substantial proportions of the foregoing." This standard is specific in designating sodium bicarbonate as the only permissible alkaline ingredient of baking powders, and in setting a minimum limit of 12% of available carbon dioxide based on the weight of the product. The much broader selectivity allowed for the acid-reacting salts permits the formulation of baking powders with markedly different properties.

Baking powders are usually classified, according to their reaction rates, into fast-acting, slow-acting, and double-acting types. Fast-acting baking powders release most of their potential gas volume during the first few minutes of contact with liquid, thus imposing the need for fairly rapid processing of the dough or batter to avoid excessive volume loss. The slow-acting powders release practically none of their gas volume at low temperatures and, hence, require oven heat to achieve complete reaction and full evolution of the carbon dioxide gas. The double-acting powders react partially at low temperatures to form smooth-flowing batters, but require high temperatures for complete reaction. The latter types of baking powder, formulated by the manufacturer to yield a uniform, regulated action, are the most commonly used in commercial cake baking.

Representative formulations of commercial baking powders are given below.

COMMERCIAL BAKING POWDER COMPOSITIONS

| | Types (double acting) | | | | | | | |
|---|---|---|---|---|---|---|---|---|
| Ingredients | A | B | C | D | E | F | G | H |
| Baking soda, granular | 27 | 30 | 30 | 30 | 30 | 30 | 30 | 30 |
| Monocalcium phosphate mono-hydrate (MCP) | — | 8.7 | 12 | 5.0 | 5.0 | — | 5.0 | 10 |
| Sodium aluminum sulfate (SAS) | — | 21 | 21 | 26 | — | — | — | — |
| Sodium acid pyrophosphate (SAPP) | — | — | — | — | 38 | 44 | 38 | — |
| Sodium aluminum phosphate (SALP) | — | — | — | — | — | — | — | 22 |
| Cream of tartar | 47 | — | — | — | — | — | — | — |
| Tartaric acid | 6 | — | — | — | — | — | — | — |
| Calcium sulfate | — | 13.7 | — | — | — | — | — | — |
| Calcium carbonate | — | — | — | 20 | — | — | — | — |
| Calcium lactate | — | — | — | — | 2.5 | — | — | — |
| Corn starch (redried) | 20 | 26.6 | 37 | 19 | 24.5 | 26 | 27 | 38 |

To assure that a preferred product results from such a dry premix, the components may be co-milled prior to mixing with other components. This procedure is disclosed in U.S. Pat. No. 3,694,230, Cooke, issued Sept. 26, 1972, which is herein incorporated by reference.

Preferably, from about 0.1 to about 10% of an emulsifier should be added to the dry premix. Suitable emulsifiers include, but are not limited to, lactylated mono- and diglycerides, propylene glycol monoesters, polyglycerol esters, sorbitan esters, diacetylated tartaric acid esters of mono- and diglycerides, citric acid esters of monoglycerides, stearoyl-2-lactylates, polysorbates, succinylated monoglycerides, acetylated monoglycerides, ethoxylated monoglycerides, lecithin, sucrose monoester, and mixtures thereof.

Polyglycerol esters suitable for use as emulsifiers in the present invention have an average of from 2 to 10 glycerol units and from 1 to 3 fatty acyl groups of from 14 to 18 carbon atoms per glycerol moiety.

Preferably, the emulsifier is first dissolved in the oil or fat to produce an emulsified shortening. For best results, the emulsifier is melted and added to the shortening at a temperature above the melting point of the emulsifier to insure a homogeneous blend.

A preferred shortening/emulsifier system is that disclosed in U.S. Pat. No. 4,456,626, Nelson et al., issued June 16, 1984, incorporated by reference herein. The shortening contains an emulsifier consisting essentially of a hydraulic polyglycerol monoester and a propylene glycol monoester, wherein the fatty acids used to esterify the polyglycerol ester and propylene glycol esters have from about $C_{16}$–$C_{22}$ carbon atoms, the ratio of propylene glycol monoester to polyglycerol ester being from about 2:1 to about 7:1. The remainder of the shortening system is fats, oils or hydrogenated fats and oils.

Any conventional methods of incorporating the emulsifier and shortening into the flour, leavening agent, and additional ingredients can be used to produce the premix. For example, the emulsified shortening and other ingredients can be combined with the flour by admixing these components in, for example, a planetary bowl mixer, a ribbon blender, a high-speed rotary mixer, or in other conventional mixers. Preferably, however, the shortening containing the emulsifier is first mixed with the flour to form an essentially homogeneous flour-shortening-emulsifier blend, and then the additional ingredients are admixed with this blend.

Packaging of the dry premix product in a sealed plastic film is sufficient. Since the water activity of the dry mix is essentially nil, i.e., from about 0.2 to about 0.4, there is little concern about microbiological growth with extended storage periods. Packaging must be done using generally accepted good manufacturing practices for foodstuffs.

The components of the present invention as described above can be formulated in several slightly different ways to yield various types of baked goods, including but not limited to, brownies, snack cakes, muffins, and cookies, all of which are within the scope of the present invention. The batter or dough of the desired snack product can be baked using radiant, conductive or convective exposure to energy of a type which imparts thermal energy to the product being baked such as conventional, convection, microwave oven baking or combination thereof. Baking times and temperatures are dependent on the type of oven used and the type of product being baked. The products may be baked in batch or continuous ovens.

To realize a maximum shelf life for any of the final baked products prepared according to the present invention, packaging which allows to moisture to pass from the snack product to the environment or vice versa is desirable. A product packaged in this way would not be degraded at all whether stored in condition of low or high humidity. Packaging which allows for microwave heating of the product prior to eating, such packaging at the same time being moisture tight, would be most desirable. The packaging should be done using generally accepted good manufacturing practices.

The following examples will illustrate the invention, but should not be construed to limit the scope thereof unless otherwise expressly noted. All parts, percentages and ratios set forth herein are by weight unless otherwise noted in context.

EXAMPLE 1

A peanut butter cookie was prepared from the following ingredients.

| Ingredient | Parts by Weight | % |
|---|---|---|
| Peanut butter (SKIPPY TM brand low salt from CPC Intl.) | 75.0 | 9.80 |
| Brown sugar | 95.0 | 12.41 |
| Butter | 31.0 | 4.04 |
| Vegetable shortening (CRISCO TM brand from Procter & Gamble Co.) | 31.0 | 4.04 |
| Water | 43.0 | 5.62 |
| Eggs (fresh, whole) | 50.0 | 6.53 |
| All purpose flour | 300.0 | 39.20 |
| Cold-water-swelling starch (MIRA-Gel ® 463 | 12.5 | 1.63 |

-continued

| Ingredient | Parts by Weight | % |
|---|---|---|
| from A.E. Staley Mfg. Co.) | | |
| Baking soda | 4.0 | .52 |
| Baking powder | 3.0 | .40 |
| Polydextrose powder (Pfizer, Inc.) | 115.0 | 15.02 |
| Peanut oil flavor (McCormick's #F44439) | 1.0 | .13 |
| Peanut butter flavor (Felton's #40847) | 5.0 | .66 |
| | 765.5 | 100 |

The ingredients were mixed by first creaming the peanut butter, brown sugar, butter and shortening and then mixing in the water, eggs and peanut flavors until blended. The remaining ingredients were then added and mixed. The dough was shaped into ¾" round balls, placed on an ungreased cookie sheet, and baked 12 minutes at 375° F.

EXAMPLE 2

A brownie was prepared from the following ingredients.

| Ingredient | Parts by Weight | % |
|---|---|---|
| Water | 38.0 | 5.27 |
| Butter | 62.5 | 8.68 |
| Sugar | 125.0 | 17.35 |
| Eggs (fresh, whole) | 50.0 | 6.94 |
| Cocoa (Dutched) | 45.0 | 6.25 |
| Flour | 150.0 | 20.82 |
| Polydextrose powder | 125.0 | 17.35 |
| Salt | 1.5 | 0.21 |
| Vanilla extract | 5.0 | 0.69 |
| Chopped nuts | 75.0 | 10.41 |
| Vanilla flavor | 5.0 | 0.69 |
| Chocolate flavor | 1.5 | 0.21 |
| Cold-water-swelling starch (MIRA-Gel ® 463 | 36.93 | 5.13 |
| from A.E. Staley Mfg. Co.) | 720.43 | 100.00 |

The ingredients were mixed by first creaming the butter and sugar with a Hobart flat paddle mixer at #2 speed. Then the eggs, salt, vanilla extract, vanilla flavor and water were added and blended, followed by addition of flour, cocoa, polydextrose, starch and nuts with mixing on #1 speed for no more than 45 seconds. The mixture was baked in a greased dish at 350° F. for 20–22 minutes.

EXAMPLE 3

A series of pie crusts were prepared from the following ingredients.

| | Parts By Weight | | |
|---|---|---|---|
| Ingredient | Control A | Control B | 3 |
| Flour (all-purpose) | 750 | 750 | 712.5 |
| Salt | 5.0 | 5.0 | 5.0 |
| Polydextrose powder | — | 130 | 130 |
| Cold-water-swelling starch (MIRA-GEL 463) | — | — | 37.5 |
| Shortening (CRISCO) | 250 | 50 | 50 |
| Water | 67.5 | 137.5 | 137.5 |
| Eggs | 50 | 50 | 50 |
| Vinegar | 5.0 | 5.0 | 5.0 |

The dry ingredients were mixed and the shortening was cut in. The wet ingredients were then slowly added with mixing. The dough was chilled in a refrigerator and then rolled out between waxed paper. The dough was then laid over a pie pan and allowed to rest for 10 minutes before baking at 425° F. for 10–18 minutes. Control A was a good pie shell. Control B dried out during the 10 minute rest period, was very tough and tacky to work and when baked exhibited wet spots and caramelized polydextrose. The pie crust of Example 3 was acceptable, much better than Control B with no wet spots or tough crust.

What is claimed is:

1. A dry blend composition useful in the preparation of baked products comprising a major amount by weight of a randomly-bonded polysaccharide and a minor amount by weight of a cold-water-gelling granular starch having a cold-water solubility of at least about 50% by weight.

2. A dry blend composition of claim 1 wherein the weight ratio of randomly-bonded polysaccharide to cold-water-gelling granular starch is from just greater than about 1:1 to about 100:1.

3. A dry blend composition of claim 1 wherein the randomly-bonded polysaccharide is polydextrose.

4. A method of formulating a culinary premix for a baked good, said culinary premix comprising flour and a member selected from the group consisting of sugar and fat, said method comprising replacing at least a portion of said member with a dry blend composition of claim 1.

5. A culinary premix composition useful for preparing baked goods comprising a major amount by weight of flour, a first minor amount by weight of a randomly-bonded polysaccharide, and a second minor amount by weight of a cold-water-gelling granular starch having a cold-water solubility of at least about 50% by weight.

* * * * *